B. DRYSDALE.
CARBURETER.
APPLICATION FILED FEB. 6, 1912.
1,088,974.
Patented Mar. 3, 1914.
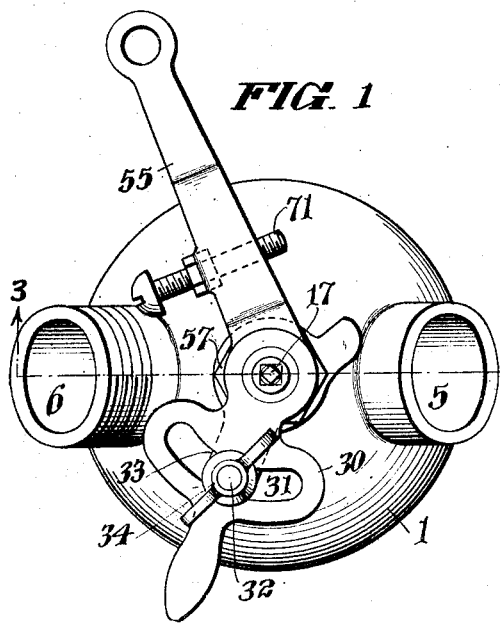
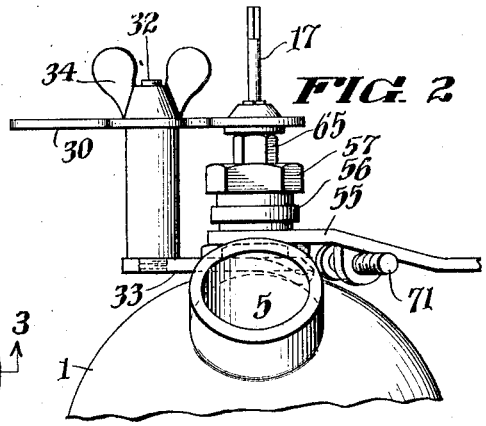
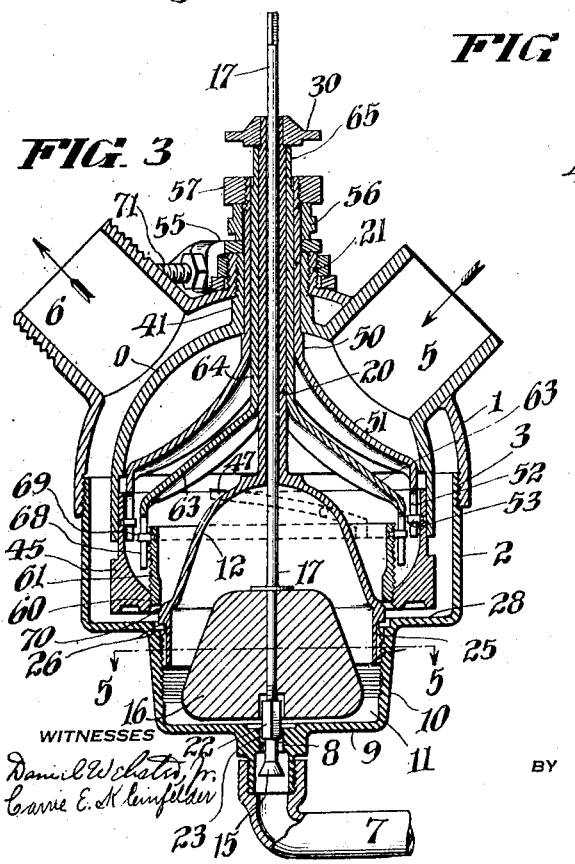
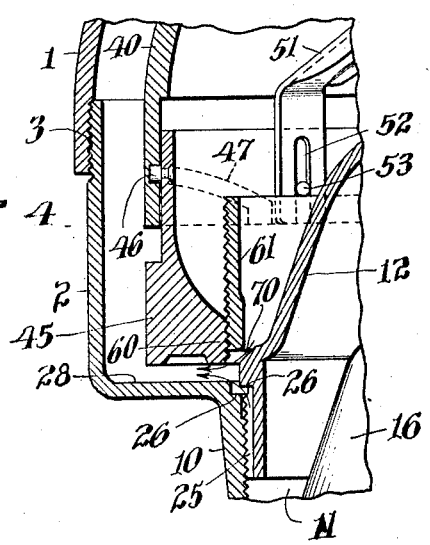
WITNESSES
Daniel Webster Jr.
Carrie E. Kleinfelder
INVENTOR
Bruce Drysdale
BY Cyrus N. Anderson
ATTORNEY

UNITED STATES PATENT OFFICE.

BRUCE DRYSDALE, OF PHILADELPHIA, PENNSYLVANIA, ASSIGNOR OF ONE-FOURTH TO JAMES W. MASON, ONE-FOURTH TO JOHN W. HULTON, AND ONE-FOURTH TO WALKER HULTON, ALL OF PHILADELPHIA, PENNSYLVANIA.

CARBURETER.

1,088,974. Specification of Letters Patent. Patented Mar. 3, 1914.

Application filed February 6, 1912. Serial No. 675,742.

*To all whom it may concern:*

Be it known that I, BRUCE DRYSDALE, a subject of the King of Great Britain, residing in the city and county of Philadelphia, State of Pennsylvania, have invented certain new and useful Improvements in Carbureters, of which the following is a full and correct description.

My invention relates to carbureters, and it has for one of its objects to provide an improvement in the means of throttling the air passage through a carbureter so as to regulate and control the flow of the mixture of inflammable material, such as gasolene, and air into the explosion chamber of a gas engine.

My invention has other objects and advantages which will be referred to and described in detail hereinafter or which will be apparent from the detailed description of my invention in connection with the drawings to which reference will be made in order that the same may be more readily comprehended and understood.

In the said drawings, I show one form of a convenient embodiment of my invention, but it will be understood that changes and modifications in the details of construction may be made within the scope of the claims, without departing therefrom.

In the drawings:—Figure 1 is a top plan view of a carbureter embodying my invention; Fig. 2 is a side elevation of the upper end portion thereof, looking toward the left in Fig. 1; Fig. 3 is a longitudinal section taken on the line 3—3 of Fig. 1; Fig. 4 is an enlarged sectional view of a portion of my carbureter, illustrating details of construction; and Fig. 5 is a transverse sectional view on the line 5—5 of Fig. 3.

Referring to the drawings, it will be observed that the carbureter is provided with a casing consisting of the members 1 and 2 which are detachably connected together, having screw-threaded connection with each other at 3, as indicated in Figs. 3 and 4 of the drawings.

The numeral 5 designates an air inlet port and the numeral 6 designates an outlet port through which the mixture of air and inflammable material, such as gasolene, passes from the carbureter to the explosion chamber of an engine (not shown).

The gasolene enters the carbureter through a supply pipe 7, which is shown in Fig. 3 of the drawings. The pipe 7 communicates with the port 8, formed in the bottom 9 of the section 2 of the carbureter. The lower end portion of the section 2 is reduced in diameter, as shown at 10, and the chamber 11 formed by means of the said reduced end portion and the dome-shaped part 12, constitutes a receptacle into which the inflammable material enters from the pipe 7. The port 8 is adapted to be opened and closed by means of a valve 15 which is controlled by a float 16 located in the chamber 11. The float is connected to the valve stem 17, which extends upwardly through a hollow stem or shaft 20 extended upwardly from the member 12 through and concentrically of a flanged opening 21 in the upper end of the member or section 1 of the casing. The height of the inflammable material in the chamber 11 is controlled by the position of the float 16 on the stem 17. The position of the float upon the said stem may be varied by screwing the said stem in or out of the member 22, polygonal in cross section, and which is connected, integrally or otherwise, with the valve 15. To facilitate the screwing of the stem 17 into or out of the member 22, I have provided a polygonal shaped collar 23 at the upper end of the port 8, corresponding to the shape in cross-section of the member 22 so that when the latter is moved down into the said collar the stem 17 may be turned in either direction, the member 22 being held stationary by the said collar. It is obvious that by screwing the member 17 into or out of the member 22, the distance between the float 16 and the valve 15 is varied, and that as a result the height of the inflammable material in the chamber 11 may be varied. It will be understood, however, that the height of the liquid in the chamber is constant for each adjustment of the float 16.

The reduced lower end 10 of the member or section 2 is internally screw-threaded, as shown in Figs. 3 and 4, which screw-threads are engaged by external screw-threads upon the lower circular end of the member 12.

Upon the exterior surface of the lower screw-threaded end of the member 12, I have provided, at intervals, grooves 25, which constitute passage-ways from which the gasolene or other inflammable material passes from the chamber 11.

26 designates opposing shoulders, one of which is formed upon the upper inner edge of the reduced end portion 10, and the other one of which is formed around the lower end portion of the member 12 at the upper end of the screw-threaded portion thereof already referred to. By screwing the part 12 up or down, the space between the said opposing shoulders 26 is increased or diminished, so that the passage of the gasolene from the chamber 11 between the shoulders is effected in the form of a thin film which spreads outward over the annular flat horizontal portion 28 of the section 2 of the casing.

As a means for adjusting the member 12, I secure to the upper end of the hollow stem 20 an arm 30 having an arcuate-shaped slot 31 therein which is in engagement with a post 32 supported upon a bracket 33 secured above the projecting flange-like member 21 upon the member 1 of the casing. By turning the arm 30 about its pivot, the hollow stem 20 is also turned and thereby causes movement of the member 12 in one direction or the other with relation to the upper edge of the reduced portion 10. The arm 30 is secured in adjusted position by the wing nut 34.

The inlet port 5 extends through the upper member 1 of the casing and communicates directly with the interior of an inner member 40 which is provided with a screw-threaded neck 41 which has screw-threaded engagement with the interior of the flange-like projection 21 upon the section 1 of the casing. The member 40 is of a shape and contour corresponding to that of the member 1 of the casing and is separated therefrom a distance sufficient to leave a space between its exterior surface and the interior surface of the member 1.

Adjustably secured to the lower end of the part 40 is an adjustable throttling annular member 45. As a means for adjusting the member 45 with relation to the lower end of the part 40, I have provided it with projecting lugs 46 which engage curved slots 47 in the part 40. Any number of these lugs and slots may be employed, but I show in my construction three. For the purpose of turning the annular member 45 with relation to the member 40 to cause its adjustment, I provide the revoluble hollow shaft-like member 50 having the laterally extending arms 51 having end portions provided with slots 52 which engage pins 53 at diagonally opposite points upon the interior of the said member 45.

The hollow shaft-like member 50 is supported within the neck 41 and its upper end projects above the upper end of the said neck and above the upper end of the flange-like part 21 and is engaged by the inner end of a lever 55. The inner end of the said lever is held in place by a collar or sleeve 56 and a nut 57, the latter being secured upon external screw-threads at the upper end of the hollow shaft-like member 50. The outer end of the said lever is provided with a connection (not shown) which extends into operative relation to the operator, by means of which it may be turned about its pivot to cause the turning or rotation of the shaft 50 to cause a consequent rotation of the annular member 45 with relation to the member 40. By reason of the connection between the annular member 45 and the part 40 heretofore described, the said member 45 is raised or lowered so that the space between its lower end and the horizontal annular flat portion 28 of the section or member 2 is increased or diminished.

The inner lower edge of the annular member 45 is extended inwardly as shown at 60 and is screw-threaded and has screw-threaded engagement with an annular member 61 which may be rotated independently of the annular member 45 by means of arms 63 which are connected, integrally or otherwise, with a hollow shaft or stem 64 located internally and concentrically of the shaft 50. The upper end of the said shaft is provided with a polygonal portion 65 by means of which it may be turned by the employment of a wrench or similar device. The lower end of the arms 63 are slotted, as indicated at 68, to receive pins 69 secured at diagonally opposite points upon the annular screw-threaded member 61. By adjusting the annular member 61 with respect to the annular member 45, the width of the space between the lower end of the annular member 61 and the shoulder or edge 70, formed upon the outer surface of the member 12, is adjusted or varied, so as to control the annular space through which the air escapes from the space between the dome-like member 12 and the interior surface of the member 40 and the annular member 45.

When the gasolene or other inflammable material escapes from the channels 25, it spreads out in a thin layer upon the horizontal part 28 of the member 2. The air escapes in a thin layer from the chamber above the dome-like member 12, between the shoulder 70 on the latter and the lower end of the annular member 61, and is then conducted underneath the lower edge or end of the annular member 45 and is caused thereby to travel or move in contact with the surface of the annular horizontal part 28 and thereby absorb therefrom the gasolene which has been deposited in a thin film or layer thereon. When the member 45 is adjusted, the member 61 is also adjusted so that the thickness of the layer or film of air which is allowed to pass into the space between the part 40 and the casing may be varied and controlled. The nearer the lower edge or end of the member 45 approaches to the horizontal annular part 28, the thinner and more film-like will be the air which passes thereunder.

The part 45 constitutes a window or shutter by means of which the passage of air and inflammable material is throttled to control the flow of the mixture of air and gasolene or other inflammable material into the explosion chamber of the engine.

To limit the downward movement of the annular member 45 toward the horizontal part 28, I provide an adjustable stop 71 upon the lever 55 which is adapted to engage the side of the inlet port 5. The limit of downward movement of the part 45 may be varied by adjusting the said stop, which adjustment is effected by turning the said stop, which is screw-threaded, to the right or to the left.

The passage of the air and the inflammable substance through the carbureter is effected by the exhaust action of the engine to which the carbureter is connected.

Having thus described my invention, I claim:—

1. In a carbureter, the combination of means for distributing inflammable fluid in a thin film over a portion of the carbureter structure, the said means including an adjustable member for varying the thickness of said film, with means for directing air in the form of a thin film over the said film of fluid to absorb the latter to produce an explosive gas for a gas engine, the said last mentioned means also including an adjustable member for varying the thickness of the film of air.

2. In a carbureter, the combination of means for distributing an inflammable fluid in the form of a film or thin coating over an annular surface of a part of the carbureter structure, the said means including an adjustable member for varying the thickness of said film, with means for directing air in the form of a film or thin layer laterally in all directions over and in contact with the said surface to absorb the fluid deposited thereon to produce an explosive mixture of air and inflammable fluid for use in a gas engine, the said last mentioned means also including an adjustable member for varying the thickness of the film of air.

3. In a carbureter, the combination of a casing having an annular portion adapted to receive a film or thin layer of combustion fluid thereon, means for supplying the said fluid thereto, adjustable means for varying the thickness of said film or layer of combustion fluid, a member adjustable toward and from the surface of said annular portion to vary and control the thickness of the thin film-like current of air which flows over the said surface, and means for causing the air to flow over the said surface radially in all directions.

4. In a carbureter, the combination of a casing having a reduced lower end portion, the upper end of which portion is connected with an annular horizontal portion of said casing, a member having adjustable connection with the said reduced portion of the casing and forming therewith a combustible fluid receiving chamber, and the said chamber being provided with channels for supplying the said fluid in the form of a thin film to the said annular horizontal portion, and means for causing a thin annular film of air to flow over and in contact with the said horizontal portion to absorb the said fluid to produce an explosive gas for use in a gas engine.

5. In a carbureter, the combination of a member of the structure having an annular combustible fluid receiving surface and means for supplying oil to such surface with an air throttling device having an annular surface situated in opposition to said combustible fluid receiving surface and means independent of the oil supplying means for adjusting the said throttling device toward and from the fluid receiving surface to control and vary the flow of air between the said surfaces.

6. In a carbureter, the combination of a casing having a reduced end portion, an inverted hollow member projecting into said reduced end portion and adjustably connected therewith to form a combustible fluid chamber, a shoulder extending around the said hollow member in opposition to a shoulder on the reduced end portion, the said opposing shoulders forming a channel to receive the fluid from said chamber, the said fluid escaping from said channel and forming a film upon the surrounding portion of the said casing, means for adjusting the said hollow member to vary and control the flow of fluid from said chamber, and means for directing a thin film of air over and in contact with the portion of the casing surrounding the said channel to absorb the film of combustible fluid therefrom.

7. In a carbureter, the combination of a casing, means for supplying a film of inflammable substance to a relatively large area of the interior surface of said casing, a stationary hollow member supported within said casing having an open end projecting toward the interior portion of the surface of said casing which is coated with said substance, a member adjustably secured to said hollow member and having a surface located in proximity to said coated surface, means for supplying air to said stationary member, and means for adjusting said adjustable member to vary the thickness of the film of air which escapes between said coated surface and the adjacent surface of the said adjustable member.

8. In a carbureter, the combination of a casing, an inverted stationary hollow member supported from one end of said casing, a gasolene or other inflammable fluid receiving chamber having a closed top which extends into the said hollow member, means for supplying said fluid in a film to the surface of said casing surrounding said chamber, an adjustable annular member secured to said inverted stationary member and surrounding the lower part of the top of said chamber, the lower end of said adjustable member being in proximity to the fluid coated portion of the surface of said casing, a second annular member having adjustable connection with the inner lower edge of the first adjustable member, means for supplying air to the said stationary hollow member, and means for adjusting the said adjustable members together or separately to vary and control the flow of air through the said carbureter.

In testimony that I claim the foregoing as my invention, I have hereunto signed my name this 5th day of February, A. D. 1912.

BRUCE DRYSDALE.

In the presence of—
CARRIE E. KLEINFELDER,
GEO. H. WEIDNER.

---

Copies of this patent may be obtained for five cents each, by addressing the "Commissioner of Patents, Washington, D. C."